United States Patent [19]

Prohn

[11] 4,336,222

[45] Jun. 22, 1982

[54] PROCESS OF AND AN APPARATUS FOR BENDING STRETCHED PLASTIC CASINGS

[75] Inventor: Christiaan M. Prohn, Parpan, Switzerland

[73] Assignee: International Chemical Engineering Establishment, Vaduz, Liechtenstein

[21] Appl. No.: 144,359

[22] Filed: Apr. 28, 1980

[30] Foreign Application Priority Data

Aug. 30, 1979 [NL] Netherlands ............ 7906526

[51] Int. Cl.$^3$ ................................ B29C 17/02
[52] U.S. Cl. .................. 264/519; 264/564; 264/565; 264/566; 264/567; 264/569; 264/281; 264/285; 264/339; 425/326.1; 425/387.1; 425/392; 425/445
[58] Field of Search .............. 264/563, 565, 564, 569, 264/281, 285, 339, 209.2, 519, 566–567; 425/326.1, 387.1, 392, 393, 445–446

[56] References Cited

U.S. PATENT DOCUMENTS

| | | | |
|---|---|---|---|
| 2,136,566 | 11/1938 | Schnecko et al. | 264/563 |
| 2,501,584 | 3/1950 | Schanz | 264/209.2 |
| 3,454,695 | 7/1969 | Holmgren | 264/281 |
| 3,884,612 | 5/1975 | Parmann | 425/392 |
| 3,917,500 | 11/1975 | Petzetakis et al. | 264/173 |
| 4,022,860 | 5/1977 | Sugeno et al. | 264/566 |

FOREIGN PATENT DOCUMENTS 7500457 7/1975 Netherlands .
163736 2/1976 Netherlands .
1163248 9/1969 United Kingdom .

Primary Examiner—Jeffery R. Thurlow
Attorney, Agent, or Firm—Barry G. Magidoff

[57] ABSTRACT

A stretched plastic casing is tensioned by means of a fluid medium after having been introduced into two clamping rollers, and conveyed to a bending member in front of or at the location of which it is subjected to a thermal treatment such, that it is bent out of its original path, while being thermally deformed, and is subsequently conveyed in the same direction of curvature, in a bent form, so as to be cooled down.

10 Claims, 4 Drawing Figures

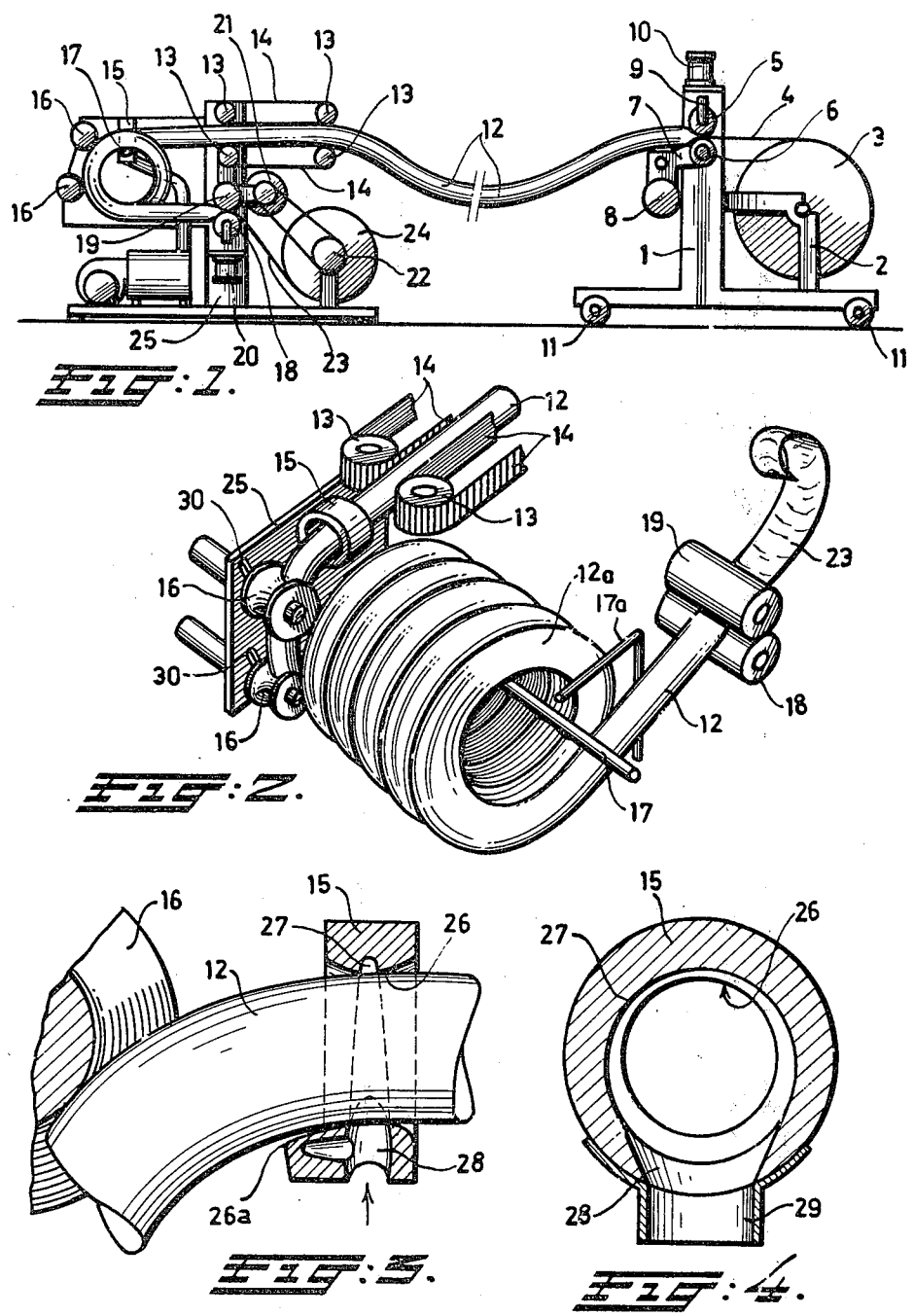

PROCESS OF AND AN APPARATUS FOR BENDING STRETCHED PLASTIC CASINGS

BACKGROUND OF THE INVENTION

1. Field of the Invention

The invention concerns a process for bending stretched plastic casings, said casings being subjected to a thermal treatment, while enclosing a certain quantity of fluid medium, being guided along a bending member in between two pairs of clamping elements.

2. Description of the Prior Art

In the prior art bent casings of plastic material in order to obtain plastic intestines for round sausages, to be used by foodstuff industries, have been used. A process and apparatus wherein certain lengths of inflated casings having tied up ends, are guided around a mandrel so as to provide said casings with a certain curvature is known too. To that end a casing is helically wound around a mandrel and subsequently separate round sausages are manufactured.

Casings filled with air or another gas wound around a heated core, prior to bending said casings, are also known per se. Hereby the inflated portion of the casing to be bent, is clasped between clamping members, thus providing a practically constant quantity of air or another flowing medium at the location of the curvature. Said air is supplied through an extrusion nozzle of an extruder, thus causing the apparatus to co-operate directly with said extruder in order to produce the desired casing. In this process a bending member is employed in the form of a roller along which the casing is guided, whilst subsequently a guiding in a transverse direction around the heating member is performed.

Although the advantages of a similar apparatus are manifold, as bending the casing happens simultaneously with its manufacture so that no additional treatment is required, said apparatus has the drawback that it cannot possibly be used for casings provided with an extra coating or, for example, an impression. Unbent material for casings is also often delivered upon reels, thus causing a treatment of said material according to the process and apparatus as described herebefore, to be impossible.

SUMMARY OF THE INVENTION

In view of the foregoing factors and conditions of the prior art it is a primary object of the present invention to provide an apparatus allowing for the bending of casings whether or not provided with an impression, whereby said casings may be reeled directly from a storing reel, while after bending them, they may be packed again directly, for instance in the form of a reel.

Starting from the principle as described hereinbefore, this object is attained according to the present invention in that the supplied casing, being tensioned by means of the fluid medium, is subjected directly in front of or in the vicinity of the bending element, to a thermal treatment and is bent out of its original path near said bending member, while being thermally deformed, the casing being subsequently conducted in the same curved direction in a bent shape, so as to be cooled.

In a preferred embodiment of the present invention an initial flat casing is pulled off from a storing reel and conveyed in between two clamping rollers, whereafter a certain length of casing is inflated, starting with the initially supplied casing, said length being subsequently tied up and being conveyed further on in between two clamping rollers, in order to maintain the quantity of inflated air or of another fluid medium in the portion of the casing presently being positioned between the two pairs of clamping rollers, which clamping rollers can be driven. The casing is, as it were, displaced around a stationary column of air or of another fluid medium. After having passed the last pair of clamping rollers, the casing may be reeled again upon a reel or may be stripped upon a mandrel. It will be obvious that the bending is performed in that portion of the casing which is tensioned, owing to the presence of air or another fluid medium in the manner as described herebefore.

The present invention is also embodied in apparatus for performing said process, said apparatus being provided with a heating device for heating the casing, with at least two pairs of clamping members (rollers) and with a bending device for bending the casing, the apparatus according to the present invention comprising a device, enclosing at least part of the circumference of the casing, said device being provided with thermal conducting means.

Preferably heated air is used as a thermal conducting means, so that the casing is strongly heated at the location of the bending member and is bent instantaneously, said casing thus being able to shrink at the inside of the curvature so produced. The material at the outside of said curvature will be somewhat stretched. It is recommended to thereby have the casing proceed helically, so that said casing will cool and the material will get "set". After having cooled, the bent casing may be reeled or stripped and is ready for use.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is a schematic lateral view of an apparatus for performing the process according to the invention;

FIG. 2 is a perspective view of part of the apparatus in schematic form, at the location where the process of bending the casing is performed;

FIG. 3 is a lateral view of a partially bent casing also showing a bending member in cross section, and FIG. 4 is a cross-sectional view of a bending member adapted to have the casing subjected to a thermal treatment by means of a flowing medium, such as, for instance, heated air.

DESCRIPTION OF A PREFERRED EMBODIMENT

In order to best understand the present invention a description of a preferred embodiment thereof is provided accompanied by drawings. Initially referring to FIG. 1 the apparatus for performing the process according to the present invention consists of an initial installation, comprising a frame 1 with a support 2 for supporting a storing reel 3. Said storing reel 3 consists of a plastic flat casing reeled upon said reel, part 4 of the casing being pulled off from the storing reel 3 and being conveyed in between two clamping rollers 5 and 6, mounted upon frame 1. Clamping roller 6 is coupled to a driving motor 8 through a transmitting device 7. Roller 6 is also capable to drive roller 5 either by friction or by means of a pair of gears. Roller 5 is suspended with its axle in a yoke 9 upon which the piston of a pressure cylinder 10 is acting. Frame 1 is displaceable for example by means of travelling rollers 11, in order to attain an effect still to be described hereinafter. Part 12 of the casing arriving between the clamping rollers 5 and 6 is inflated and its leading portion is tied up for time being, thus producing a tensioned casing filled with air or another suitable fluid medium. Said casing is subsequently disposed in a driving apparatus, consisting of two endless conveyor belts 14 being conveyed by means of two reversing rollers 13.

The portions of the two conveyors 14 facing one another operate in a direction remote from the clamping rollers 5 and 6. The conveying velocity of the conveyors 14 practically equals the circumferential velocity of the clamping rollers 5 and 6. The conveyors 14 have the filled casing portion 12 pass through a bending member 15, at the location of which said casing portion is subjected to a thermal treatment. The path of the casing portion 12 being pushed out of the bending member 15, comprises a deflection device in the form of a rotatable roller 16. Said roller 16 should be driven with a rotational velocity such, that the heated casing at that moment being in a plastified state, cannot possibly be propelled such, that the respective material is unnecessarily deformed. The use of more than one roller 16, said rollers being positioned in a curved path, may be advantageous. Roller 16 causes the casing to be bent out of its original path and subsequently to be curved due to a thermal treatment in a manner to be explained hereinafter. Referring now to FIG. 2 a minor support, for example a rod 17 will suffice to helically wind the bent casing, said casing then being able to cool down in that position. After having cooled completely, the casing may be cold-deformed, while maintaining the obtained curvature. An additional rod 17a causes the windings to be kept near one another and the casing so obtained is subsequently discharged through clamping rollers 18 and 19. Said clamping rollers 18 may be operated by a pressure cylinder 20 in a manner as described for the clamping roller 5 and the pressure cylinder 10 (see also FIG. 1). The clamping roller 18 is connected to de drive motor 21, which motor may also drive the conveyors 14 and a reel 22 (see FIG. 1). Portion 23 of the casing 12, discharged by the clamping rollers 18 and 19 has regained a flat shape and may be formed to a packet, e.g. in the form of a roll 24 upon reel 22 (FIGS. 1 and 2). The casing is preferably reeled up in a direction corresponding to its curvature.

It is observed that portion 12 of the casing, being filled with a fluid medium, such as e.g. air, is constantly positioned in between two pairs of clamping rollers, to wit rollers 5 and 6 and rollers 18 and 19, respectively. The constant presence of a column of air or of another fluid medium, causes the casing, as it were, to be displaced around said column. In theory the possibility might exist that a slight amount of air or of another fluid medium to be used, would escape, for example in the folds of the portion 23 of the casing. In view of having portion 12 of the casing permanently tensioned in a sufficient manner, frame 1 of the apparatus according to the present invention, is displaceable with respect to frame 25. By decelarating the drive of the clamping rollers 5 and 6 with respect to the drive of the conveyor(s) 14 and the clamping rollers 18 and 19, thus causing the circumferential velocity of the clamping rollers 5 and 6 to become lower than the conveying velocity of the conveyor(s) 14, portion 12 of the casing is being tensioned between frames 1 and 25, so that said frame 1 may approach said frame 25, thereby reducing the quantity of air or of another fluid medium of the existing column in portion 12 and tensioning said portion 12 again in a sufficient manner. To that end frame 1 may be driven by a motor. A detector being disposed upon a suitable location on casing 12, may automatically adapt the drive of the clamping rollers 5 and 6. It will be obvious that a displacement of frame 1 may be discontinuous.

Referring now to FIG. 4, illustrating apparatus for performing the process according to the present invention, the bending member 15, in this case having an annular shape, is adapted to subject the casing 12 to a thermal treatment. Said annular shape is, however, not essential as the respective bending member may also be adapted to part of the circumference of the casing 12, at the side where the inner bend will be made in the bent portion 12a, as a result of the pressure of the deflection member 16. In that case the bending member may have the shape of a small comb (FIG. 3), the casing being subjected to a thermal treatment directly in front of said comb.

The use of an annular bending member is, however, preferred for an aim to be described hereafter. The inner circumference 26 which need not necessarily directly adjoin the wall of casing 12, is provided with a groove 27, which circumferential groove is accomodated eccentrically with respect to the inner circumference 26 in such a manner that the groove 27 possesses the largest contours at the location where the inner bend of the bent casing 12 is going to get disposed. At that spot the ring 15 also comprises a port 28, being connected with a line 29 for the supply of a heating medium, preferably consisting of air. It will be obvious that heated air being supplied to the circumferential groove 27 through line 29, will cause the chamber formed by said circumferential groove to transmit more heat at the location of the port 28 and the wider part of the circumferential groove 27, than at the location of the smaller part of said circumferential groove. The port 28 and the wider part of the circumferential groove 27 being positioned at the location of the point, where the inner bend in the casing is determined, it goes without saying that more heat is transmitted to that point than to the location which is going to get located outside the bend in the casing 12.

In order to additionally smooth the inside of the bend or curvature, the inner circumference of the ring has been extended by an extension 26a (FIG. 3), also initiating the bending operation in the bending member 15 in case of displacing roller 16 serving as a deflector, and increasing or reducing the radius of curvature in the casing 12. Said displacement of each roller 16 may easily be effected by displacing the axle of the roller(s) in a groove 30 of frame 25 of the apparatus according to the invention. As can be seen in FIG. 2, the windings of the casing 12 together form a coil, the inner space of which may be heated by means of a spreading nozzle upon frame 25 in order to have the interior of the casing "after-set," if necessary. Said additional heating device need not necessarily be mounted, as the heat transmission in member 15 generally suffices. Member 15 may also be shifted with respect to the direction of casing 12, thus enabling air to escape outside at a preferred location, in order to permit a subsequent heating to be performed. If desired, an additional small air passage aperture may be provided in the vicinity of part 26a, at the location of which heated air may escape abroad in order to blow against a previously bent part of casing 12.

From the free end of rod 17 cool air may also be blown into the interior of the coil, formed by windings of casing 12, thus effecting a forced cooling of said casing 12.

What is claimed is:

1. In a continuous process for producing curved sausage casing, the process comprising inflating a portion of the length of a continuously moving strip of sausage casing between first and second clamped longitudinally separated locations, selectively heating a first circumferential portion of the inflated casing at an intermediate location and forming a curved inflated casing, the improvement wherein the first circumferential portion is selectively heated without contacting said first portion with a solid surface, so as to thermally shrink the heated portion of the casing and thus cause a curvature of the inflated casing, and further comprising directing the curvature of the inflated casing into a desired curved shape by contacting a second circumferential portion of the inflated casing against a deflecting surface at an adjacent intermediate location, the second circumferential portion forming the outer curvature of the curved inflated casing, and the first circumferential portion forming the inner curvature of the curved casing, the second portion being substantially opposite the heated first portion; continuously collecting the curved inflated casing to form a helical coil of the inflated casing; loosely supporting the helical coil by a support; and cooling the coiled inflated casing while being loosely supported; the first circumferential portion being out of contact with a solid surface when being heated and when the second portion is being pressed against the deflecting surface.

2. The process of claim 1, wherein the coil is supported on its inner curved surface upon a longitudinal member having an outside diameter substantially less than the inside diameter of the coil.

3. The process of claim 1 wherein the selective heating is provided by passing a heated fluid against the full circumference of the inflated casing, wherein the amount of fluid passed against the first circumferential portion provides greater heat to the casing than the fluid passed against the remaining circumferential portion at that location.

4. The process of claim 1 comprising pressing the helical coil axially so as to maintain successive helical coil portions in adjacent juxtaposition on the support.

5. The process of claim 1, wherein the selective heating is provided by directing a heated fluid against the first circumferential portion.

6. The process of claim 5, comprising applying additional heat to the first circumferential portion after it is initially curved to smooth the inner curvature surface.

7. In apparatus for continuously forming curved inflated sausage casing, the apparatus comprising first and second clamping means for clamping the inflated casing at first and second longitudinally separated locations, moving means for continuously moving the casing between the first and second clamping means, and means for heating and curving the inflated casing into the shape of a helical coil, the heating and curving means being located intermediate the first and second clamping means; the improvement wherein the heating and curving means comprises means for selectively heating a first portion of the circumference of the inflated sausage casing without contacting the first portion with a solid surface; and further comprising support means for supporting and conveying an inflated casing, the support means being adjacent the heating means, between the heating means and the first clamping means; at least one rotatable deflecting member disposed adjacent the selective heating means, between the heating means and the second clamping means, so as to contact a second circumferential portion of the inflated heated casing diametrically opposite to the selectively heated first circumferential portion; drive means for rotating the deflecting member; and a bending support member immediately adjacent the heating means and extending from the heating means towards the deflecting member, the bending support member and the deflecting member being so relatively disposed that an inflated casing passing therebetween will be continuously moved and directed into a curved path limited thereby.

8. The apparatus of claim 7 wherein the heating means comprises an annular ring having an interior diameter greater than the exterior diameter of the inflated sausage casing, an annular channel depression formed on the inner circumference of the ring, and an inlet portion extending from the outer circumference of the ring to the channel for carrying heated fluid to the channel, the channel having an irregular, generally circular shape, wherein the portion of the channel immediately adjacent to the inlet has a larger cross-section than the remainder of the channel.

9. The apparatus in accordance with claim 8 wherein the deflecting member is a rotatable roller having a concave channel formed around its outer circumference and designed to accommodate a portion of the circumference of the inflated casing.

10. The apparatus in accordance with claim 8 comprising two deflecting means disposed to successively deflect the same circumferential portion of an inflated sausage casing so as to more precisely provide the desired curved sausage casing.

* * * * *